United States Patent [19]

Koerner

[11] 3,984,764
[45] Oct. 5, 1976

[54] INDUCTIVE LOOP STRUCTURE FOR DETECTING THE PRESENCE OF VEHICLES OVER A ROADWAY

[75] Inventor: Steve J. Koerner, Simi Valley, Calif.

[73] Assignee: Canoga Controls Corporation, Canoga Park, Calif.

[22] Filed: Mar. 3, 1975

[21] Appl. No.: 554,657

[52] U.S. Cl. .................................. 324/41; 340/38 L
[51] Int. Cl.² ............................................ G01R 33/12
[58] Field of Search ........................... 324/41, 67, 3; 340/38 L, 38 R, 39, 258 R, 258 C

[56] References Cited
UNITED STATES PATENTS

| | | | |
|---|---|---|---|
| 3,184,730 | 5/1965 | Irish | 340/258 C |
| 3,312,935 | 4/1967 | Brothman et al. | 340/38 L |
| 3,697,996 | 10/1972 | Elder et al. | 340/38 L |
| 3,863,206 | 1/1975 | Rabie | 340/38 L |

FOREIGN PATENTS OR APPLICATIONS

| 829,718 | 7/1938 | France | 340/38 L |
|---|---|---|---|

*Primary Examiner*—Robert J. Corcoran
*Attorney, Agent, or Firm*—Lindenberg, Freilich, Wasserman, Rosen & Fernandez

[57] ABSTRACT

An improved inductive loop structure useful for detecting metal objects such as vehicles on a roadway. The two terminal loop is formed by a conductive wire configured to define two substantially rectangular paths lying side by side in a common plane such that respective sides of the two paths lie adjacent one another. Alternating current is supplied to the terminals of the wire to produce a commonly oriented magnetic field around the adjacent sides of the rectangular paths and an oppositely oriented magnetic field of lesser magnitude around each of the outer sides of said rectangular paths. As a consequence, the field components interact to enhance field strength within the area bounded by said outer sides and reduce field strength outside of that area.

9 Claims, 4 Drawing Figures

INDUCTIVE LOOP STRUCTURE FOR DETECTING THE PRESENCE OF VEHICLES OVER A ROADWAY

BACKGROUND OF THE INVENTION

This invention relates generally to metal object detection and more particularly to an inductive loop structure suitable for detecting the passage or presence of a vehicle over a defined area of roadway.

Inductive loops have been used extensively for several years in various applications to facilitate detecting the presence or passage of a vehicle over a monitored area of a roadway. For example, such inductive loops have been used in conjunction with various types of electronic detectors in traffic actuated control systems for developing the input data required by a controller to control traffic signal lights. In another typical application, a loop may be connected through detector circuitry to a counter for accumulating a count of vehicle flow past a certain point. In either application, the inductive loop is intended to monitor the presence or passage of a metal mass in an area of given dimensions.

Inductive loop configurations known in the prior art have generally consisted of an insulated conductive wire (e.g. number 14 stranded copper) formed of simple rectangular geometry. A typical loop in a traffic lane might consist of one or more turns of conductor and have a width of 6 feet and a length (in the direction of traffic) of from 6 to 100 feet. Each loop operates in conjunction with electronic detector circuitry such that the loop together with components of the detector circuitry form an oscillator whose frequency is dependent upon the inductance of the loop. Loop inductance is in turn dependent on whether or not the loop is loaded by the presence of a vehicle. A vehicle over the loop decreases loop inductance and thus increases the frequency of oscillation. The remaining circuitry of the detector monitors and responds to these changes in frequency.

Although known prior art inductive loop configurations have enjoyed wide commercial acceptance (see, "Selection of Vehicle Detectors for Traffic Management," F. R. Hulscher, *Traffic Engineering* J *Control*, Dec. 1974, p. 915), they suffer from certain inherent limitations: (1) the field strength outside the loop perimeter is often sufficient to erroneously "recognize" a vehicle in an adjacent lane as being within the loop; (2) the field strength within the loop perimeter is often insufficient to recognize the presence of certain small vehicles, such as bicycles; (3) the field strength within the loop perimeter often lacks uniformity such that sensitivity in certain areas of the loop is lacking, producing "dead spots." Although any one of these problems can generally be avoided, any improvement is usually achieved at the expense of one or more of the other problems.

In view of the foregoing, the present invention is directed to an improved inductive loop configuration which substantially reduces the adverse effects of the aforementioned limitations, resulting in a more efficient monitoring of the specified area.

SUMMARY OF THE INVENTION

The present invention is directed to an improved inductive loop which exhibits a more uniform field strength across the area bounded by the loop perimeter and a reduced field strength outside of that area, as compared to prior art loops, so as to be more immune to adjacent lane effects.

In accordance with a preferred embodiment of the invention, a two-terminal inductive loop is formed by a conductive wire configured to define two substantially rectangular paths lying side by side in a common plane such that respective sides of the two paths lie adjacent one another. Alternating current is supplied to the terminals of the wire to produce a commonly oriented magnetic field around the adjacent sides of the rectangular paths and an oppositely oriented magnetic field of lesser magnitude around each of the outer sides of said rectangular paths. As a consequence, magnetic field components are produced which interact to produce an enhanced field strength within the area bounded by the outer sides and a reduced field strength outside of that area.

DESCRIPTION OF THE PREFERRED EMBODIMENT

Figures 1, 2:
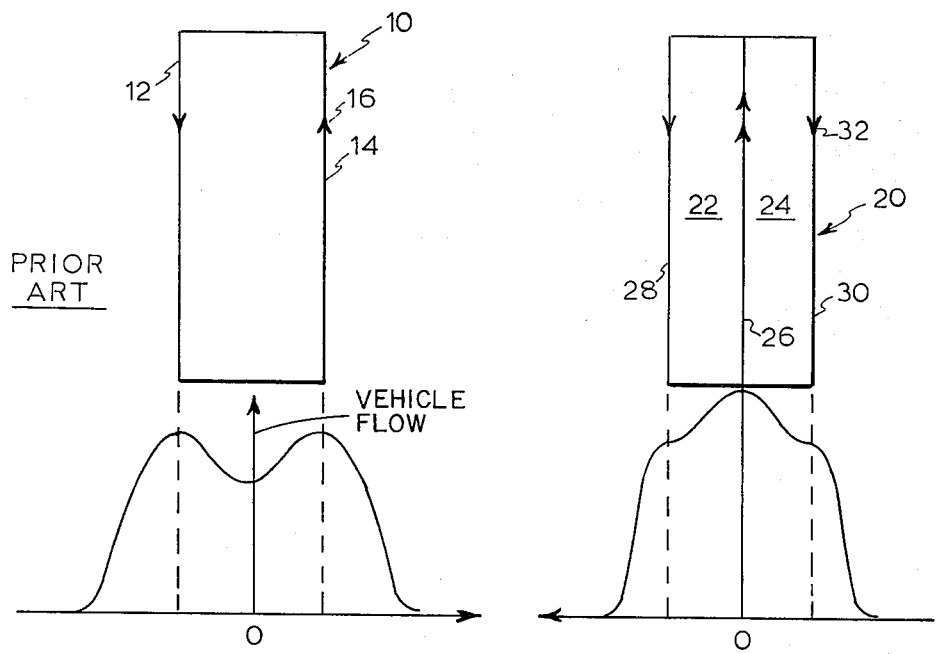
FIG. 1 is a schematic representation depicting the field strength produced across the width of a conventional inductive loop of rectangular geometry.
FIG. 2 is a schematic representation depicting the field strength produced across an inductive loop configured in accordance with the present invention.

FIG. 1 schematically depicts a typical prior art inductive loop configuration 10 for detecting metal objects within a defined area. The loop 10 of FIG. 1 comprises a single rectangular turn of wire typically installed in a traffic lane with the side bars 12 and 14 thereof oriented parallel to the flow of vehicular traffic. An electrical current, represented by the arrows 16, produces a dipole magnetic field pattern across the width of the loop, at the height of concern above the roadway, as is shown in FIG. 1. Note well that the magnetic field produced by the current 16 extends considerably beyond the side bars 12 and 14. As a consequence of the magnetic field "spilling over" outside of the area bounded by the loop, vehicles in adjacent lanes affect the inductance of the loop 10.

Attention is now called to FIG. 2 which schematically depicts a loop configuration 20 in accordance with the present invention. The loop 20 is formed by a conductive wire configured to define two substantially rectangular current paths. It can be considered as consisting of two narrow loops 22 and 24 laid side by side and including a common center bar 26 and outer bars 28 and 30. Electrical current, represented by the arrows 32, is supplied to the loop 20 so as to produce commonly directed equal magnitude currents in bars 28 and 30 and an oppositely directed double magnitude current in center bar 26.

As a consequence of the depicted current flows in FIG. 2, magnetic field components will be produced around the bars 26, 28, and 30 which will interact to produce a quadrupole magnetic field pattern as shown in FIG. 2. Comparison of the field pattern of FIG. 2 with the field pattern of FIG. 1 demonstrates that the loop 20 produces an enhanced field strength within the area bounded by the loop and a reduced field strength outside of the loop perimeter, as compared to the conventional loop 10 of FIG. 1.

Reduced field strength outside of the bars 28 and 30 of loop 20 is attributable to the interaction of the field components produced by bars 26, 28 and 30. That is, the fields respectively produced around bars 28 and 30 tend to be cancelled outside of the loop perimeter by the higher magnitude field produced around center bar 26.

Figure 3:
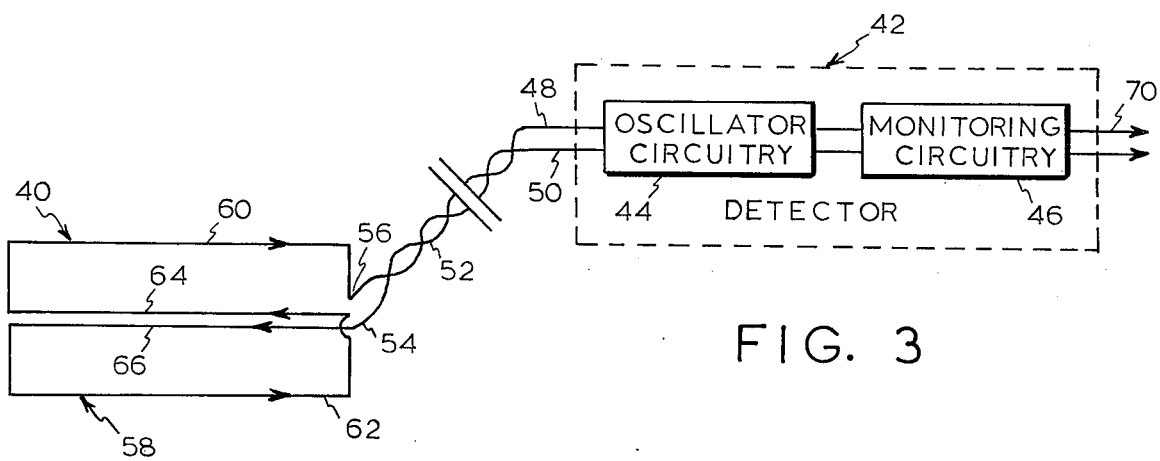
FIG. 3 is a schematic block diagram showing the manner of connecting a loop in accordance with the present invention to electronic detection circuitry.

Attention is now directed to FIG. 3 which illustrates a loop 40 connected to an electronic detector 42. Various suitable electronic detectors are readily available commercially. For example only, detector 42 can comprise the PROXIMITOR 104 loop detector manufactured by Canoga Controls Corporation, Canoga Park, California.

The detector 42 is essentially comprised of oscillator circuitry 44 and monitoring circuitry 46. The oscillator circuitry 44 has two terminals 48 and 50 which are connected by a twisted wire pair 52 to terminals 54 and 56 of the loop 40. The terminals 54 and 56 may merely comprise ends of a conductive wire 58 configured as depicted in FIG. 3. More particularly, the conductive wire 58 is configured to define four parallel straight portions comprised of outer bars 60 and 62 and adjacent inner bars 64 and 66. Note that a current supplied through the conductive wire 58 from terminal 54 to terminal 56 will be driven in the same direction along bars 64 and 66 and in an opposite direction along bars 60 and 62. As a consequence, the loop 40 of FIG. 3 will produce a magnetic field having a pattern of the shape depicted in FIG. 2.

As is well known, the entrance of an electrically conductive body, such as a vehicle, into the magnetic field produced by the loop 40 varies the inductance of the loop and thus the frequency of oscillation of the signal supplied by the oscillator circuitry 44. The circuitry 46 monitors the frequency of the oscillatory signal and responds to a sufficient frequency shift to produce a "detect" or "call" signal on output terminals 70. Output terminals 70 are typically connected to a traffic controller or counter circuitry.

Figure 4:
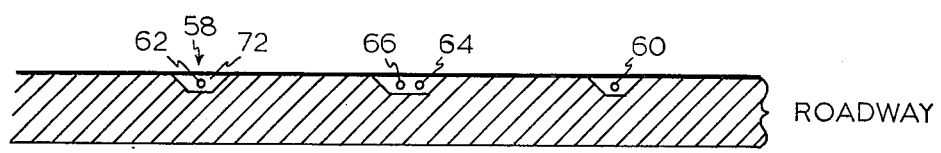
FIG. 4 is a cross-sectional view showing the manner in which an inductive loop in accordance with the present invention is installed in a roadway.

FIG. 4 shows the manner in which the loop 40 of FIG. 3 can be mounted in a roadway. Typically, a conductive wire is mounted in the roadway by forming a slot 72 in the roadway surface using a diamond saw blade. The wire 58 is then placed therein and the slot is then closed with a suitable epoxy. FIG. 4 illustrates the adjacent conductors 64 and 66 lying side by side in a common slot. Alternatively of course, the conductors 64 and 66 could be installed in separate but proximate slots.

Although a particular preferred embodiment of the invention has been disclosed herein, various alternative configurations, falling within the scope of the claimed invention, will readily occur to those skilled in the art. For example only, although the loop illustrated in FIGS. 3 and 4 consists of only a single turn, it will be recognized that in certain installations, it may be desirable to utilize more than one turn of wire. Also, although the preferred loop embodiment disclosed herein employs a conductive wire configured to define two substantially rectangular current paths lying side by side in a common plane, it should be recognized that more than two paths can be utilized, if desired, while still achieving the magnetic field interaction to effect a field enhancement within the loop perimeter and a field cancellation outside of the loop perimeter.

The embodiments of the invention in which an exclusive property or privilege is claimed are defined as follows:

1. An inductive loop apparatus useful with means for sensing changes in inductance for detecting the presence of vehicles over a roadway defining a vehicular lane, said apparatus comprising:
   electrically conductive path means having first and second terminals and configured therebetween to define at least a first straight portion, a second straight portion, a third straight portion, and a fourth straight portion;
   means supporting said conductive path means in a plane substantially parallel to said roadway with said first, second, third and fourth portions within said lane and extending substantially parallel thereto and in the direction of vehicular flow and with said second and third portions proximate to one another and said first portion spaced therefrom in one direction and said fourth portion spaced therefrom in the opposite direction; and
   means in said conductive path means for interconnecting said first, second, third and fourth portions to steer an electrical current entering said first terminal and exiting from said second terminal in a first direction in said second and third portions and in a second opposite direction in said first and fourth portions.

2. The apparatus of claim 1 including:
   circuit means coupled to said first and second terminals for producing an alternating electrical current in said conductive path means.

3. The apparatus of claim 2 further including:
   second circuit means for detecting variations in said electrical current.

4. An inductive loop apparatus useful with means for sensing changes in inductance for detecting the presence of vehicles over a roadway defining a vehicular lane, said apparatus comprising:
   a length of conductive wire having first and second terminals and configured therebetween to define at least a first straight portion, a second straight portion, a third straight portion, and a fourth straight portion;
   means supporting said length of conductive wire in a plane substantially parallel to said roadway with said first, second, third and fourth portions within said lane and extending substantially parallel thereto and in the direction of vehicular flow and with said second and third portions proximate to one another and said first portion spaced therefrom in one direction and said fourth portion spaced therefrom in the opposite direction; and
   means in said length of conductive wire for interconnecting said first, second, third and fourth portions to steer an electrical current entering said first terminal and exiting from said second terminal in a first direction in said second and third portions and in a second opposite direction in said first and fourth portions.

5. The apparatus of claim 4 wherein said means supporting said length of conductive wire includes a slot formed in the surface of said roadway and wherein said length of conductive wire rests in said slot.

6. The apparatus of claim 4 including:

circuit means coupled to said first and second terminals for producing an alternating electrical current in said conductive path means.

7. The apparatus of claim 4 further including:
second circuit means for detecting variations in said electrical current.

8. Apparatus useful for detecting the presence of a vehicle over a substantially rectangular area of roadway having a length dimension extending in the direction of vehicular traffic and a width dimension extending transverse to the direction of vehicular traffic, said apparatus comprising:
means defining first and second electrically conductive paths oriented substantially parallel to said roadway and respectively aligned with opposite boundaries of said rectangular area spaced by said width dimension thereby being parallel to the direction of vehicular flow;
means defining a third electrically conductive path oriented substantially parallel to said roadway and said first and second electrically conductive paths and spaced approximately equally from said first and second electrically conductive paths;
means for producing substantially equal magnitude commonly directed electrical currents in said first and second electrically conductive paths and an oppositely directed electrical current in said third electrically conductive path, said current in said third path having a magnitude substantially twice the magnitude of said current in said first path.

9. The apparatus of claim 8 including:
circuit means for detecting variations in said electrical current;
utilization means for supplying varying outputs in response to said variations detected by said circuit means.

* * * * *